(12) United States Patent  
Cao

(10) Patent No.: US 8,660,014 B2  
(45) Date of Patent: Feb. 25, 2014

(54) METHOD AND SYSTEM FOR MPLS-TP TUNNEL PROTECTION PROCESSING

(75) Inventor: Chaopeng Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 166 days.

(21) Appl. No.: 13/497,715

(22) PCT Filed: May 11, 2010

(86) PCT No.: PCT/CN2010/072612
§ 371 (c)(1),
(2), (4) Date: Mar. 22, 2012

(87) PCT Pub. No.: WO2010/145350
PCT Pub. Date: Dec. 23, 2010

(65) Prior Publication Data

US 2012/0182990 A1    Jul. 19, 2012

(30) Foreign Application Priority Data

Sep. 30, 2009 (CN) .......................... 2009 1 0178939

(51) Int. Cl.
*H04L 12/26* (2006.01)
*H04L 12/28* (2006.01)

(52) U.S. Cl.
USPC .......................................... 370/242; 370/389

(58) Field of Classification Search
USPC .......................................... 370/242–245, 389
See application file for complete search history.

(56) References Cited

U.S. PATENT DOCUMENTS

| 7,197,008 B1 * | 3/2007 | Shabtay et al. | 370/218 |
| 8,014,410 B2 * | 9/2011 | Sergeev et al. | 370/401 |
| 8,179,900 B2 * | 5/2012 | Kitada | 370/395.53 |
| 2004/0160958 A1 | 8/2004 | Oh | |
| 2009/0175280 A1 * | 7/2009 | Berechya et al. | 370/395.53 |
| 2010/0309778 A1 * | 12/2010 | Young | 370/219 |

FOREIGN PATENT DOCUMENTS

| CN | 1852254 A | 10/2006 |
| CN | 1929444 A | 3/2007 |
| CN | 101414951 A | 4/2009 |
| CN | 101483595 A | 7/2009 |
| CN | 101662426 A | 3/2010 |

OTHER PUBLICATIONS

International Search Report from corresponding PCT application PCT/CN2010/072612, mailed Aug. 26, 2010 (with English translation).

* cited by examiner

*Primary Examiner* — Hong Cho
(74) *Attorney, Agent, or Firm* — IPLM Group, P.A.

(57) ABSTRACT

The present invention discloses a method and system for processing an MPLS-TP tunnel protection, including: a tail node of a multiprotocol label switching transport profile (MPLS-TP) tunnel, after receiving a data message, querying a private network label table of the tail node according to a private network label carried in the data message, and acquiring a value of a protection flag field; when judging that a protection type of the MPLS-TP tunnel is 1+1 according to the value of the protection flag field, acquiring a value of a difference bit number field, and determining a value of a corresponding difference bit in a public network label of the MPLS-TP tunnel; and acquiring a value of a decision field, and carrying out corresponding processing on the data message according to a comparison result of the value of the difference bit and the value of the decision field.

12 Claims, 4 Drawing Sheets

METHOD AND SYSTEM FOR MPLS-TP TUNNEL PROTECTION PROCESSING

TECHNICAL FIELD

The present invention relates to a data forwarding technology in the data communication field, and particularly, to a method for processing an MPLS Transport Profile (MPLS-TP) tunnel protection.

BACKGROUND OF THE RELATED ART

The MPLS-TP is a connection-oriented packet transfer technology based on multiprotocol label switching (MPLS) defined by the International Telecommunications Union (ITU-T). The MPLS-TP data forwarding plane is a subset of the MPLS, the data of which is forwarded based on the MPLS-TP label. MPLS-TP is the application of MPLS in a transfer network, which simplifies some complicated functions of the MPLS data forwarding plane and increases functions such as connection-oriented operation administration and maintenance (OAM) and protection recovery and so on.

The configuration of the MPLS-TP tunnel is on nodes. Each node is a segment of the tunnel, there are ingresses and egresses on the nodes, but not all the nodes have ingresses or egresses. There is no ingress at the head of the tunnel (i.e. head node), and the absent ingress is replaced by an example access; and likewise, there is no egress at the tail of the tunnel (i.e. tail node), and the absent egress is replaced by an example access also. Usually, the processing at the head node portion of the tunnel is referred to as uplink processing of the tunnel, and the processing at the tail node portion of the tunnel is referred to as downlink processing of the tunnel.

The configuration of the MPLS-TP service is mainly divided into two portions, which are respectively an example portion and an MPLS-TP tunnel portion. The example portion is mainly used to access the data message at the private network user side to the public network tunnel side or access the data message at the public network tunnel side to the private network user side. The configuration near the private network user side is referred to as a user side interface (CIP) configuration, which includes the information of user access (such as interface type and interface content); and the configuration near the public network tunnel side is referred to as a public network side interface (VIP) configuration, which includes a public network label table, a private network label table and information of a next hop node; during configuration, the tunnel information is usually bound on the VIP to determine the next hop node and the public network label of this tunnel.

There are mainly two protection types of the MPLS-TP tunnel, which are respectively:

protection type 1+1, at the ingress of the tunnel (i.e., at the head node), the data message will be copied as two copies, one of them will be sent to the primary tunnel, and the other will be sent to the backup tunnel, i.e., protection tunnel; and at the egress of the tunnel (i.e., at the tail node), the data message will be analyzed and judged, if the current primary tunnel is valid, then the data message on the primary tunnel will be forwarded and the data message on the protection tunnel will be discarded, and if the current primary tunnel is invalid, then the data message on the primary tunnel will be discarded and the data message on the protection tunnel will be forwarded;

protection type 1:1, at the ingress of the tunnel, the tunnel state is judged, if the primary tunnel is valid, then the data message will be sent from the primary tunnel; and if the primary tunnel is invalid, then the data message will be sent from the protection tunnel.

During the practical data message processing, the operation of the data message is judged by querying table entries and then how to operate is decided, therefore it needs to pre-configure the table entries, including the public network label table and the private network label table. On the tunnel, the intermediate node only includes the public network label table, and the head node and the tail node simultaneously include the public network label table and the private network label table. In the related art, the table entry configuration of the tail node is as follows:

the public network label table: a public network label is taken as a key value and information of the corresponding tunnel end flag field (for judging whether the data message reaches the tail node) is written into this table; if the protection type configured by the tunnel end is 1+1 and the primary tunnel is valid, then information of the discard field is written into the public network label table corresponding to the protection tunnel (the data message is sent from the primary tunnel); and if the primary tunnel is failed, then information of the discard field is written into the public network label table corresponding to the primary tunnel, and at the same time the discard field in the public network label table corresponding to the protection tunnel is cleared (the data message is sent from the protection tunnel);

the private network label table: a private network label is taken as a key value, the corresponding routing information is written into this table, and the data message can be forwarded from the tail node of the current tunnel according to the routing information.

In the related art, the processing of the MPLS-TP tunnel 1+1 protection at the tail node is shown in FIG. 1, including the following steps.

In step 101, the current node extracts the public network label and the private network label from the received data message.

In steps 102-103, the current node first queries its own public network label table according to the public network label, and judges whether there is a public network label table corresponding to the public network label, i.e., judges whether a corresponding public network label table can be found according to the public network label, if no, step 103 is performed, and this node directly discards the data message (which indicates that the data message is forwarded to a wrong node); and if yes, step 104 is performed.

In steps 104-105, the current node confirms whether the tunnel end flag field in its own public network label table is valid, if the tunnel end flag field is invalid, it indicates that the data message has not reached the end of the tunnel and it still needs to be forwarded continuously; step 105 is performed, at this moment, this node replaces the public network label carried in the data message to the public network label corresponding to the next hop node according to the public network label table, and forwards the data message to the next hop node, the flow returns to step 101; and if the tunnel end flag field is valid, it indicates that the data message has reached the tunnel end (i.e., this node is the tail node of the tunnel), and step 106 is performed.

In step 106, the tail node queries its own private network label table according to the private network label, and judges whether there is a private network label table corresponding to the private network label, i.e., judges whether a corresponding private network label table can be found according to the private network label, if no, then step 103 is performed, in which the data message is directly discarded; and if yes, then step 107 is performed.

In step 107, it is judged whether the discard field in the public network label table is valid, if the discard field valid, it indicates that the current tunnel is invalid, and step 103 is performed to discard the data message; and if the discard field is invalid, it indicates that the current tunnel is valid.

In step 108, the corresponding routing information is acquired from the private network label table, and subsequent forwarding is performed on the data message.

During the processing in the above solution, the tail node needs to query the table entries twice: firstly, querying the public network label table to judge whether the data message has reached the tail node, and secondly, querying the private network label table to confirm the forwarding route of the data message. For some network processors, querying the table entry needs to wait for several time cycles, which will affect the data processing performance and delay the forwarding of the data message.

CONTENT OF THE INVENTION

In view of that, the main purpose of the present invention is to provide a method and system for processing an MPLS-TP tunnel protection, which can solve the problem in the related art that the network processor of the node querying the table entries needs to wait for several time cycles when the MPLS-TP tunnel carries out data message forwarding and thus it causes the problem that the data processing performance is reduced.

In order to achieve the above purpose, the technical solution of the present invention is realized as follows.

The present invention provides a method for processing an MPLS-TP tunnel protection, which includes:

a tail node of a multiprotocol label switching transport profile (MPLS-TP) tunnel, after receiving a data message, querying a private network label table of the tail node according to a private network label carried in the data message, and acquiring a value of a protection flag field;

when judging that a protection type of the MPLS-TP tunnel is 1+1 according to the value of the protection flag field, acquiring a value of a difference bit number field from the private network label table, and determining a value of a corresponding difference bit in a public network label of the MPLS-TP tunnel; and acquiring a value of a decision field from the private network label table, and carrying out corresponding processing on the data message according to a comparison result of the value of the difference bit and the value of the decision field.

Furthermore, the tail node receiving the data message is: extracting the public network label from the received data message; and judging that the data message reaches the tail node of the MPLS-TP tunnel according to a static label field in the public network label.

Furthermore, before acquiring the value of the protection flag field, the method further includes:

judging whether a corresponding private network label table is able to be found according to the private network label, if the corresponding private network label table is not able to be found, then discarding the message, and if the corresponding private network label table is able to be found, then acquiring the value of the protection flag field.

Furthermore, when judging that the protection type of the MPLS-TP tunnel is not 1+1 according to the value of the protection flag field, the method further comprises: forwarding the data message from the MPLS-TP tunnel.

Furthermore, the determining the value of the corresponding difference bit in the public network label of the MPLS-TP tunnel is:

determining the value of the corresponding difference bit in the public network label of an MPLS-TP primary tunnel according to the value of the difference bit number field and the public network label carried in the data message from the MPLS-TP primary tunnel; and determining the value of the corresponding difference bit in the public network label of a MPLS-TP protection tunnel according to the value of the difference bit number field and the public network label carried in the data message from the MPLS-TP protection tunnel.

Furthermore, setting of the difference bit number field in the private network label table is:

comparing the public network label of the MPLS-TP primary tunnel with the public network label of the MPLS-TP protection tunnel from low bit to high bit in turn; and setting the bit number where the difference appears in the value of the public network label for the first time as the value of the difference bit number field.

Furthermore, setting of the decision field in the private network label table is:

when no protection switching occurs between the MPLS-TP primary tunnel and the MPLS-TP protection tunnel, the value of the decision field being an XOR result of the value of the corresponding difference bit in the public network label of the MPLS-TP primary tunnel with 0; and when protection switching occurs between the MPLS-TP primary tunnel and the MPLS-TP protection tunnel, the value of the decision field being an XOR result of the value of the corresponding difference bit in the public network label of the MPLS-TP primary tunnel with 1; and correspondingly, the carrying out the corresponding processing on the data message is: when the value of the difference bit is equal to the value of the decision field, forwarding the data message from the corresponding MPLS-TP tunnel; otherwise, discarding the data message.

Furthermore, setting of the decision field in the private network label table is:

when no protection switching occurs between the MPLS-TP primary tunnel and the MPLS-TP protection tunnel, the value of the decision field being an XOR result of the value of the corresponding difference bit in the public network label of the MPLS-TP primary tunnel with 1; and when protection switching occurs between the MPLS-TP primary tunnel and the MPLS-TP protection tunnel, the value of the decision field is an XOR result of the value of the corresponding difference bit in the public network label of the MPLS-TP primary tunnel with 0; and correspondingly, the carrying out the corresponding processing on the data message is: when the value of the difference bit is unequal to the value of the decision field, forwarding the data message from the corresponding MPLS-TP tunnel; otherwise, discarding the data message.

The present invention further provides a system for processing an MPLS-TP tunnel protection, which comprises: a data receiving module, a data query module, a judgment module and a data processing module, wherein, the data receiving module is configured to receive a data message from a multiprotocol label switching transport profile (MPLS-TP) tunnel;

the data query module is configured to query a private network label table according to a private network label carried in the data message, and acquiring a value of a protection flag field; further configured to acquire a value of a difference bit number field from the private network label table when the judgment module judges that a protection type of the MPLS-TP tunnel is 1+1, and determine a value of a corresponding difference bit in a public network label of the MPLS-TP tunnel; and further configured to acquire a value of a decision field from the private network label table;

the judgment module is configured to judge that the protection type of the MPLS-TP tunnel is 1+1 according to the value of the protection flag field; and further configured to compare the value of the difference bit and the value of the decision field, and provide a comparison result to the data processing module; and the data processing module is configured to carry out corresponding processing on the data message according to the comparison result.

Furthermore, the operation of the data processing module carrying out the corresponding processing on the data message comprises: forwarding the data message from the MPLS-TP tunnel or discarding the data message.

The system further includes: a data storage module, configured to store the private network label table; wherein, the judgment module is further configured to judge that the data message reaches the tail node of the MPLS-TP tunnel according to a static label field in the public network label carried in the received data message; and further configured to judge whether a corresponding private network label table is able to be found in the data storage module according to the private network label before acquiring the value of the protection flag field; and correspondingly, according to a query result, when the corresponding private network label table is not found, the data processing module is further configured to discard the data message; and when the corresponding private network label table is found, the query module acquiring the value of the protection flag field.

The system further includes a setting module, configured to set the protection flag field, the difference bit number field and the decision bit-field in the private network label table.

In the solution for processing the MPLS tunnel protection in the present invention, the static label field is set in the public network label, so that it is determined that the data message has reached the tail node directly by this static label field without querying the public network label table; in addition, in the tail node, by adding the relevant information about the public network label carried in the data message into the private network label table, for example, the protection flag field, the difference bit number field and the decision field are set in the private network label table, then the tail node only needs to query the private network label table once when processing the data message, and thus can decide to discard or forward the data message, which saves the time for querying the public network label table and improves the data processing performance of the MPLS-TP tunnel.

PREFERRED EMBODIMENTS OF THE PRESENT INVENTION

Hereinafter, the technical solution of the present invention will be further described in detail in combination with the accompanying drawings and specific embodiments.

Figure 1:
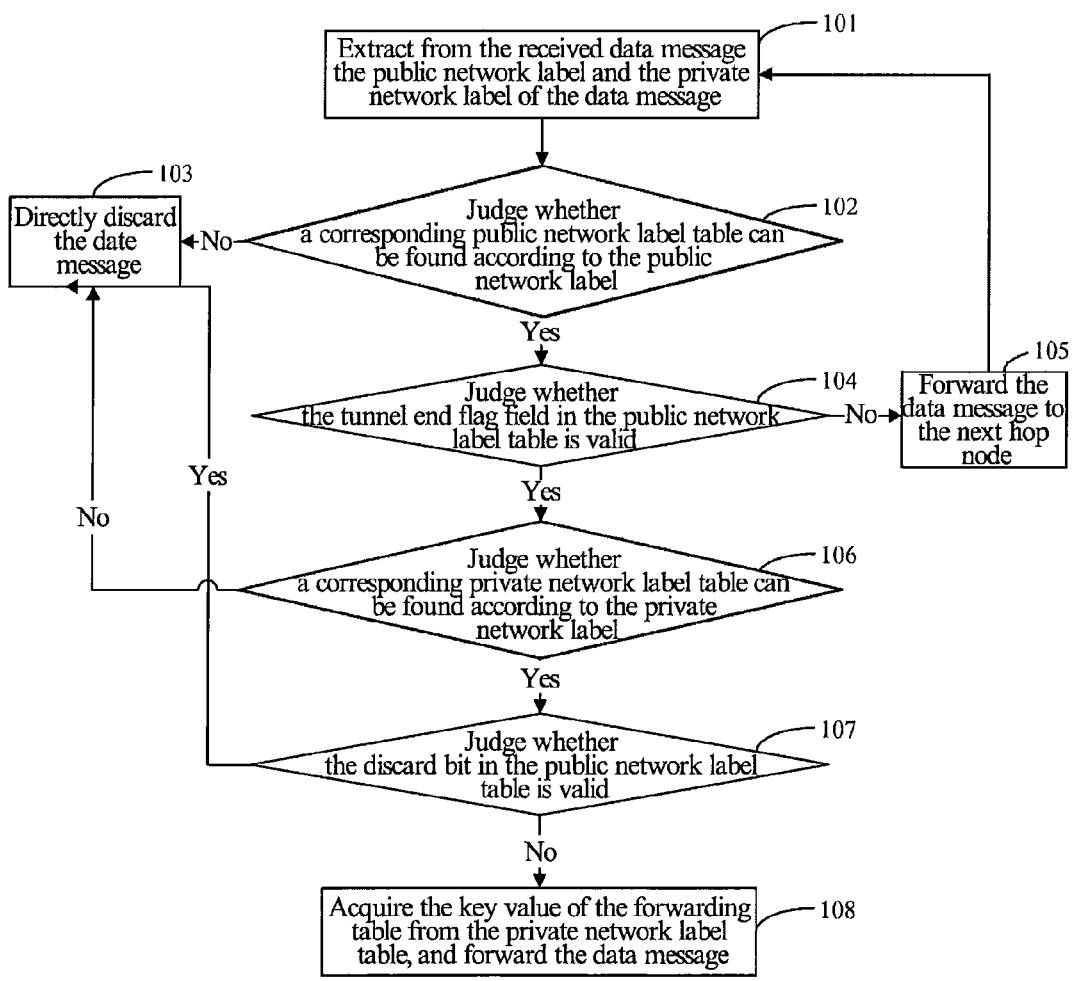
FIG. 1 is a schematic diagram of a processing flow of MPLS-TP tunnel 1+1 protection at a tail node in the related art.
Figure 2:
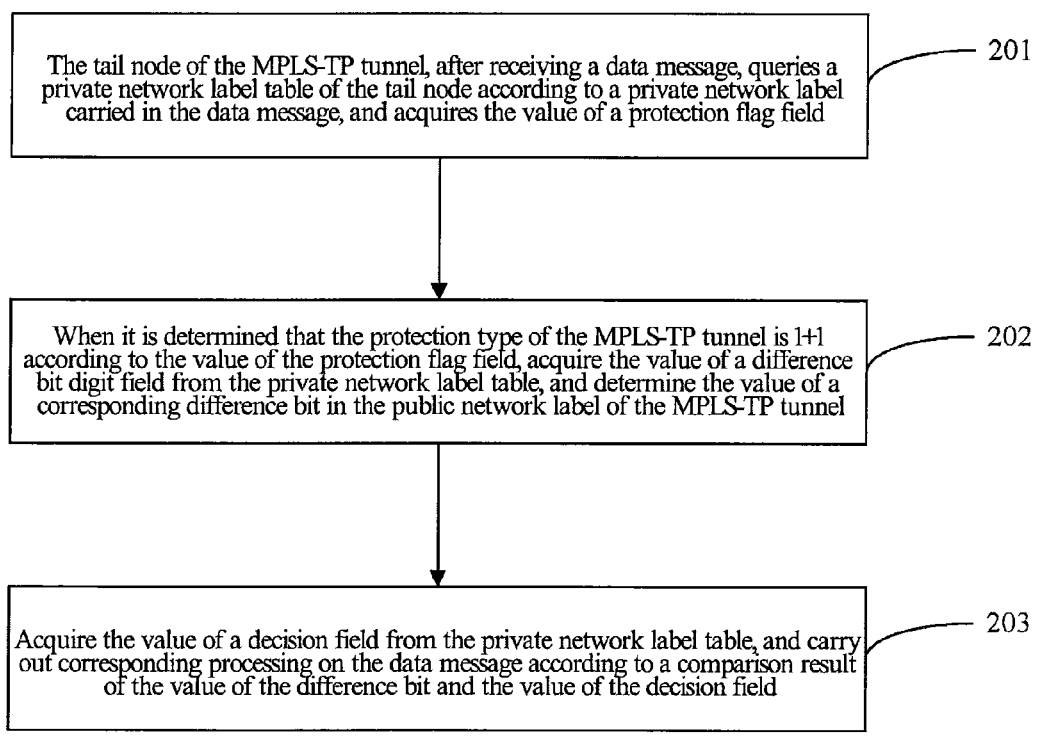
FIG. 2 is a flow chart of a method for processing an MPLS-TP tunnel protection of the present invention.

The solution for processing the MPLS-TP tunnel protection of the present invention is suitable for the protection switching of the MPLS-TP tunnel, the protection type of which is 1+1; in the solution, the tail node can complete the forwarding of the data message by querying the private network label table once. The specific processing flow is shown in FIG. 2, including the following steps:

in step 201, the tail node of an MPLS-TP tunnel, after receiving a data message, queries a private network label table of the tail node according to a private network label carried in the data message, and acquires a value of a protection flag field;

in step 202, when judging that the protection type of the MPLS-TP tunnel is 1+1 according to the value of the protection flag field, a value of a difference bit number field is acquired from the private network label table, and a value of a corresponding difference bit in a public network label of the MPLS-TP tunnel is determined; and in step 203, a value of a decision field is acquired from the private network label table, and corresponding processing is carried out on the data message according to the comparison result of the value of the difference bit and the value of the decision field.

It needs to carry out some presetting operations before carrying out the above flow, which are mainly the settings of the corresponding public network label of the tail node and the private network label table contained in the tail node.

For the setting of the public network label: a static label field is set in the public network label corresponding to the tail node, and that field is used for indicating whether the current node is the tail node, i.e., whether the data message has reached the tunnel end can be confirmed. The practical application situation is as follows: the last second hop node on the current tunnel replaces the public network label of the data message as the public network label corresponding to the next hop node (i.e., tail node) according to its own public network label table; in this way, the tail node, after receiving the data message, extracts the public network label carried in the current data message, and can judge whether the data message has reached the tail node according to the static label field therein. For example, the highest bit of the public network label is set as the static label field as required, and when this field is set as 1, it indicates that the data message has reached the tunnel end, i.e., tail node.

For the setting of the private network label table: based on the setting of the above public network label, whether the data message has reached the tail node can only be judged, and if it needs to judge whether to discard the data message, it still needs to set the private network label table: placing the information about the public network label into the private network label table. Since the value size of the public network label is 20 bits, such as 1000 0011 1010 0111 1000, if the public network label is directly placed into the private network label table, it will occupy a lot of entry resources, and the following method is used in the present invention to solve that problem.

1) One protection flag field is set in the private network label table, e.g., indicated by ProFlg, and the protection flag field is used for indicating the protection type of the MPLS-TP tunnel. For example, when the protection type is 1+1, ProFlg=1 can be set as required, and then when the corresponding protection type is 1:1, ProFlg=0; and when the protection type is 1+1, ProFlg=0 can also be set, and then when the corresponding protection type is 1:1, ProFlg=1. Of course, there can be other setting modes as required. The setting mode of the protection flag field adopted in the present invention can make the size of the protection flag field be the smallest, i.e., 1 bit.

2) Each node on the tunnel corresponds to two public network labels: a primary tunnel label and a protection tunnel label. The primary tunnel label and the protection tunnel label which correspond to the tail node are compared from low bit to high bit (the $0^{th}$ bit to the $19^{th}$ bit) in turn, and the serial number of the bit where a difference appears between two label values for the first time (difference bit for short), such as the $2^{nd}$ bit, is recorded. Specifically, one difference bit number field (e.g., indicated by count) can be set in the private network label table to record the bit number corresponding to the above difference bit. For example, the value of the primary tunnel label is 1000 0011 1010 0111 1000, the value of the protection tunnel label is 1000 0100 1011 1000 0100, the comparison is started from the $0^{th}$ bit, it can be found that the values at the $2^{nd}$ bit have difference, i.e., the $2^{nd}$ bit is the difference bit, and the count field is set as 10 (2), the size of which is 2 bits at this moment. This field can reach 5 bits to the biggest, because if the difference bit is the highest bit, i.e., the $19^{th}$ bit, then the count field is set as 10011 (19), and the size is 5 bits. The value of the corresponding difference bit in the public network label can be determined by this difference bit number field.

3) A decision field is set in the private network label table, for example, it can be indicated by CFlg. When setting the value of this field, preferably, the primary tunnel is valid by default. According to the above difference bit number field, at this moment, the value recorded by the decision field is the XOR of the value of the corresponding difference bit in the primary tunnel label (value of the primary tunnel difference bit for short) with 0, i.e., CFlg=the value of primary tunnel difference bit^0; and when it needs to carry out the protection switching between the primary tunnel and the protection tunnel, the value of the decision field will be reset, and at this moment, the value recorded by the decision field is the XOR of the value of primary tunnel difference bit with 1, i.e., CFlg=the value of primary tunnel difference bit^1. It can be seen that the size of the decision field is 1 bit.

It can be known from the above setting that the maximum size of all the fields (difference bit number field, decision field and protection flag field) added in the private network label table is: 5 bit (difference bit number field)+1 bit (decision field)+1 bit (protection flag field)=7 bit. It can be seen that the 20 bit public network label is replaced as the above most 7 bit information, which significantly saves the used entry resources.

In addition, based on the setting of the above private network label table, the judgment about whether to discard the data message can be carried out, and specifically, it will be illustrated in the following embodiment.

Figure 3:
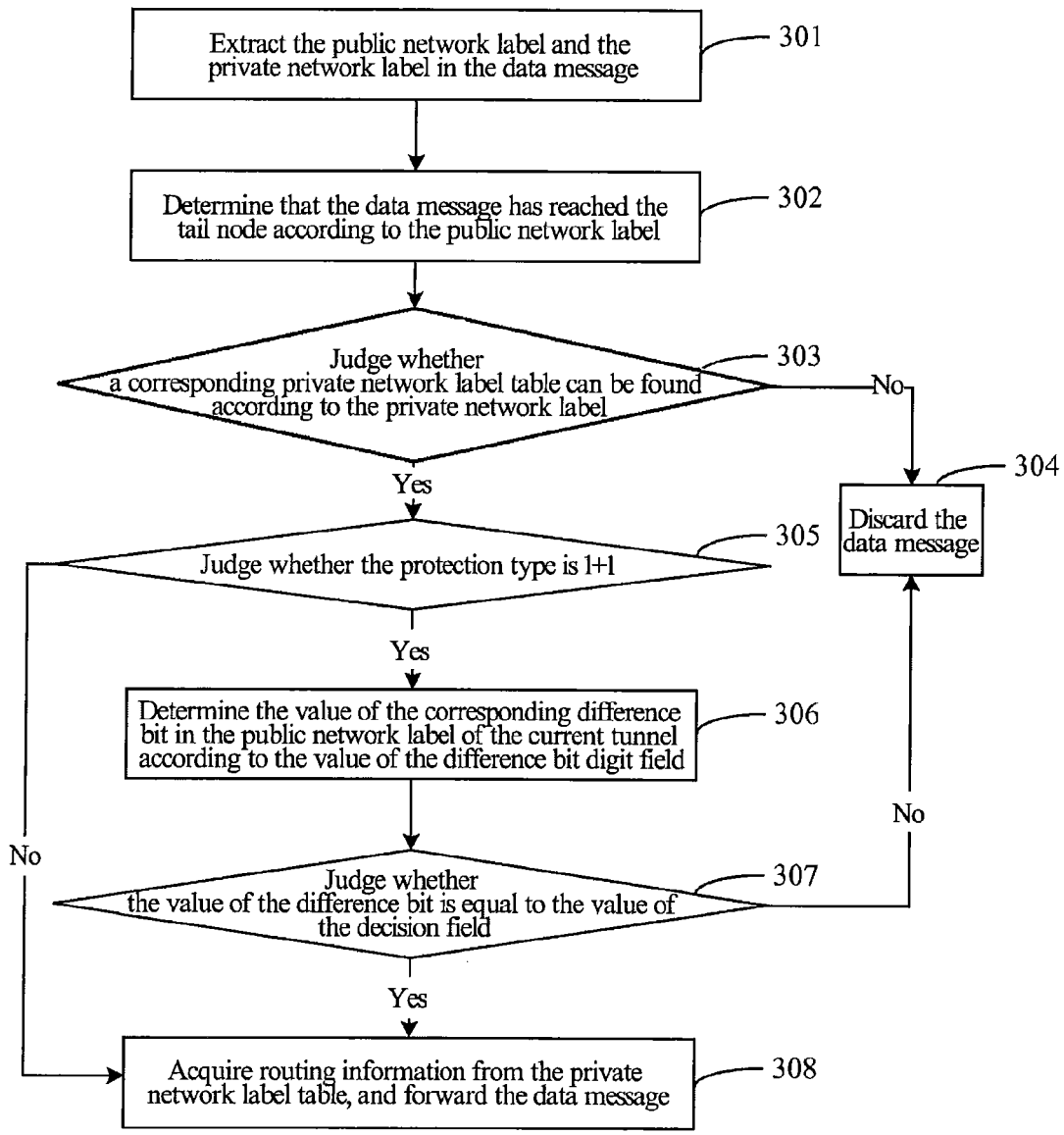
FIG. 3 is a flow chart of a procedure of MPLS-TP tunnel 1+1 protection at a tail node of the present invention.

As shown in FIG. 3, it is a flow chart of a processing flow of the MPLS-TP tunnel 1+1 protection at the tail node, including the following steps.

In step 301, the public network label and the private network label in the data message are extracted.

The current node extracts the public network label and the private network label carried in the data message from the data message.

In step 302, it is judged that the data message has reached the tail node according to the public network label.

According to the static label field in the public network label, it can be determined whether the data message has reached the tail node, which is specifically as the description about the static label field in the setting portion of the public network label in the present invention. The processing flow shown in FIG. 3 is the processing at the tail node, that is, herein it is determined that the data message has reached the tail node. If this node is an intermediate node, then the flow is carried out according to the forwarding procedure of the data message by the intermediate node in the existing flow, which will not be described herein redundantly.

In steps 303-304, it is judged whether a corresponding private network label table can be found according to the private network label, if no, then the data message is discarded; and if yes, then step 305 is performed.

The processing of this step is the same as step 106, which will not be described herein redundantly.

In step 305, it is judged whether the protection type is 1+1 according to the value of the protection flag field, if yes, then step 306 is performed; and if no, then step 308 is performed.

The tail node queries its own private network label table according to the private network label, acquires the protection flag field therein, i.e., the value of ProFlg field, and judges the protection type of the current MPLS-TP tunnel. The specific implementation is as the setting of the above protection flag field, which will not be described herein redundantly.

If the current protection type is 1+1, then step 306 is performed; if the current protection type is 1:1, then step 308 is performed, in which, according to the forwarding characteristic of the MPLS-TP tunnel to the data message when the protection type is 1:1, at this moment, the corresponding routing information is directly acquired from the private network label table according to the private network label and subsequent forwarding is carried out on the data message, and this procedure ends.

In step 306, the value of the corresponding difference bit in the public network label of the current tunnel is determined according to the value of the difference bit number field.

If the current protection type is 1+1, then the tail node acquires the difference bit number field, i.e., the value of count field, from the private network label table, and can determine the value of the corresponding difference bit in the public network label of the current tunnel (primary tunnel or protection tunnel) according to this value. If the value of the count field is 10, it indicates that the position where the difference appears between the value of the primary tunnel label and the value of the protection tunnel label for the first time is the $2^{nd}$ bit.

When protection type is 1+1, the tail node will receive the data message from the primary tunnel and the protection tunnel simultaneously, and the difference therebetween merely lies in that the public network labels, i.e., the primary tunnel label and the protection tunnel label, are different. For example, when the value of the primary tunnel label is 1000 0011 1010 0111 1000 and the value of the protection tunnel label is 1000 0100 1011 1000 0100, the value of the difference bit corresponding to the value of the primary tunnel label is 0, and the value of the difference bit corresponding to the value of the protection tunnel label is 1.

In step 307, it is judged whether the value of the difference bit is equal to the value of the decision field, if yes, then step 308 is performed, and if no, then the flow returns to step 304 and the data message is discarded.

After the value of the difference bit is determined, the value of the decision field is acquired from the private network label table, both of the values are compared, and corresponding processing is carried out on the data message according to the comparison result (step 308: forwarding, or step 304: discarding).

By the method of defaulting that the primary tunnel is valid and setting the value of the decision field as: CFlg=the value of primary tunnel difference bit^0 in the present invention, then when the value of the current tunnel difference bit is equal to the value of the decision field, it is considered that this tunnel is valid and step 308 is performed; otherwise, it is considered that this tunnel is invalid, and the flow returns to perform step 304 and the data message is discarded. Undertaking the example of step 306, it is defaulted that the primary tunnel is valid, then CFlg=the value of the primary tunnel difference bit^0=0^0=0; it can be known that the value of the primary tunnel difference bit is 0 and is equal to CFlg=0, and then the primary tunnel is valid; the value of the protection tunnel difference bit is 1 and is unequal to CFlg=0, and then the protection tunnel is invalid, correspondingly, the data message sent over the protection tunnel is discarded.

It needs to note that, if the protection switching occurs between the primary tunnel and the protection tunnel, then the tail node resets the decision field in the private network label table, and then at this moment, what is recorded by the decision field is the XOR between the value of the primary tunnel difference bit with 1, i.e., CFlg=the value of the primary tunnel difference bit^1=0^1=1; and at this moment, the value of the primary tunnel difference bit is 0 and is unequal to CFlg=1, and then the primary tunnel is invalid and discards the data message sent by the primary tunnel; and the value of the protection tunnel difference bit is 1 and is equal to CFlg=1, and then the protection tunnel is valid.

In addition, when setting the decision field, it is defaulted that the primary tunnel is valid; if the value of the decision field is set as: CFlg=the value of the primary tunnel difference bit^1, then when the value of the current tunnel difference bit is unequal to the value of the decision field, it is considered that this tunnel is valid and step 308 is performed; otherwise, it is considered that this tunnel is invalid, the flow returns to perform step 304, and the data message is discarded. If the protection switching occurs between the primary tunnel and the protection tunnel, then the value of the decision field is reset as CFlg=the value of the primary tunnel difference bit^0; and then, when the value of the primary tunnel difference bit is unequal to the value of the decision field, it is considered that this tunnel is valid; otherwise, it is invalid.

In step 308, the routing information is acquired from the private network label table and the data message is forwarded.

When the current tunnel is valid, the data message sent over this tunnel is forwarded: the routing information is acquired from the private network label table according to the private network label to forward, and the specific implementation is the related art, which will not be described herein redundantly.

Figure 4:
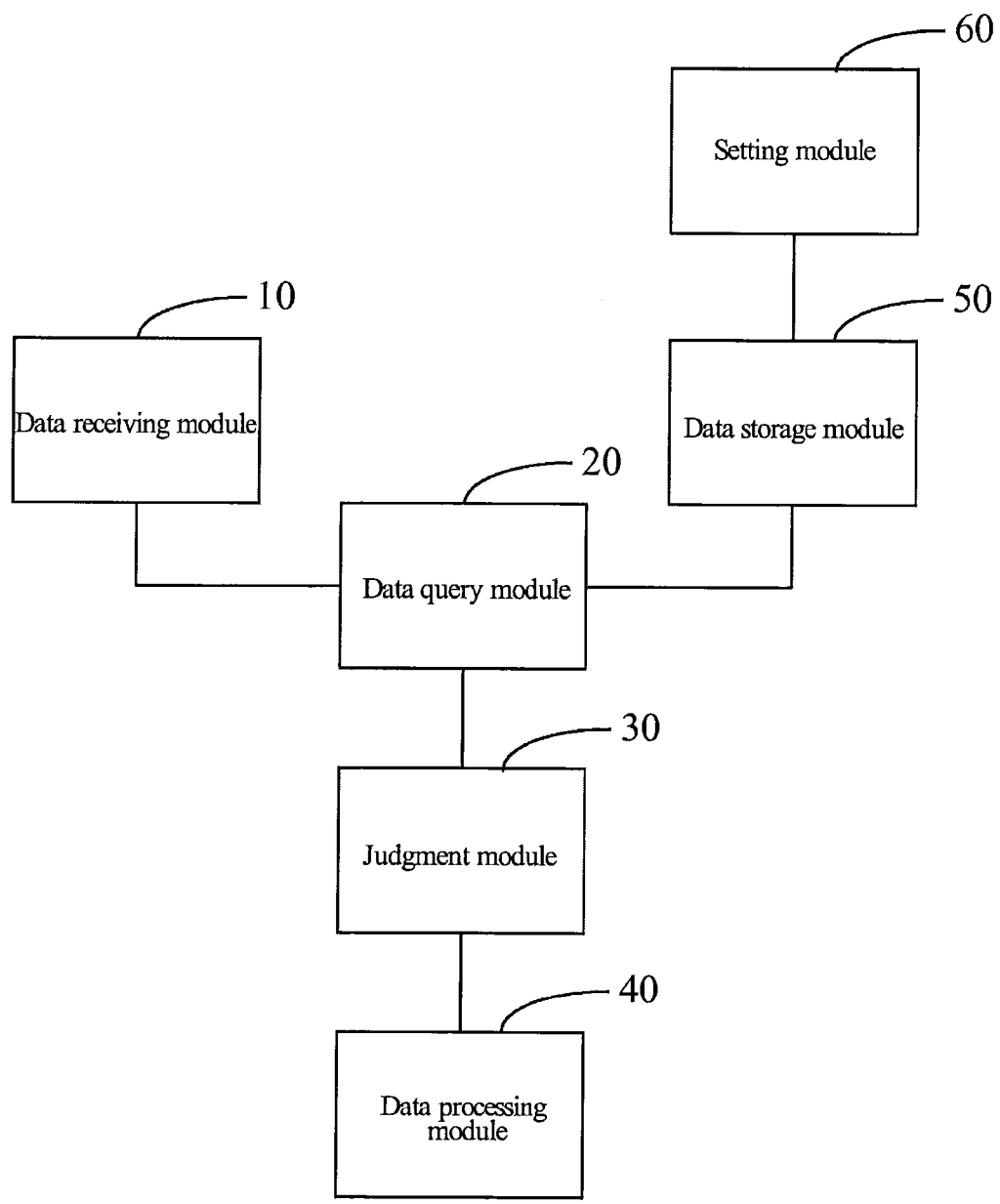
FIG. 4 is a structural diagram of a system for processing an MPLS-TP tunnel protection of the present invention.

In order to achieve the above method, a system for processing an MPLS-TP tunnel protection is provided by the present invention. The system is applied in the tail node of the MPLS-TP tunnel, and as shown in FIG. 4, this system includes: a data receiving module 10, a data query module 20, a judgment module 30 and a data processing module 40, wherein, the data receiving module 10 is used for receiving a data message from an MPLS-TP tunnel;

the data query module 20 is used for querying a private network label table according to a private network label carried in the data message, and acquiring the value of a protection flag field; further used for acquiring the value of a difference bit number field from the private network label table when the judgment module 30 judges that the protection type of the MPLS-TP tunnel is 1+1, and determining the value of a corresponding difference bit in a public network label of the MPLS-TP tunnel; and further used for acquiring the value of a decision field from the private network label table;

the judgment module 30 is used for judging that the protection type of the MPLS-TP tunnel is 1+1 according to the value of the protection flag field; and further used for comparing the value of the difference bit and the value of the decision field, and providing the comparison result to the data processing module 40; and the data processing module 40 is use for carrying out corresponding processing on the data message according to the above comparison result.

In this case, the operation of the data processing module 40 carrying out the corresponding processing on the data message comprises: forwarding the data message from the MPLS-TP tunnel, or discarding the data message.

The system further includes: a data storage module 50, used for storing the private network label table;

the judgment module 30 is further used for judging that the data message reaches the tail node of the MPLS-TP tunnel according to a static label field in the public network label carried in the received data message; and further used for, before acquiring the value of the protection flag field, judging whether the corresponding private network label table can be found in the data storage module 50 according to the private network label. Correspondingly, according to the above query result, when the corresponding private network label table is not found, the data processing module 40 is further used for discarding the data message; and when the corresponding private network label table is found, the query module 20 acquires the value of the protection flag field.

The system further includes a setting module 60, used for setting the protection flag field, difference bit number field and decision field in the private network label table.

The above description is merely preferred embodiments of the present invention and is not intended to limit the protection scope of the present invention.

I claim:

1. A method for processing an MPLS-TP tunnel protection, comprising:
   a tail node of a multiprotocol label switching transport profile (MPLS-TP) tunnel, after receiving a data message, querying a private network label table of the tail node according to a private network label carried in the data message, and acquiring a value of a protection flag field;
   when judging that a protection type of the MPLS-TP tunnel is 1+1 according to the value of the protection flag field, acquiring a value of a difference bit number field from the private network label table, and determining a value of a corresponding difference bit in a public network label of the MPLS-TP tunnel; and
   acquiring a value of a decision field from the private network label table, and carrying out corresponding processing on the data message according to a comparison result of the value of the difference bit and the value of the decision field.

2. The method according to claim 1, wherein, the tail node receiving the data message is:
   extracting the public network label from the received data message; and
   judging that the data message reaches the tail node of the MPLS-TP tunnel according to a static label field in the public network label.

3. The method according to claim 1, wherein, before acquiring the value of the protection flag field, the method further comprises:
judging whether a corresponding private network label table is able to be found according to the private network label, if the corresponding private network label table is not able to be found, then discarding the message, and if the corresponding private network label table is able to be found, then acquiring the value of the protection flag field.

4. The method according to claim 1, wherein, when judging that the protection type of the MPLS-TP tunnel is not 1+1 according to the value of the protection flag field, the method further comprises: forwarding the data message from the MPLS-TP tunnel.

5. The method according to claim 1, wherein, the determining the value of the corresponding difference bit in the public network label of the MPLS-TP tunnel is:
determining the value of the corresponding difference bit in the public network label of an MPLS-TP primary tunnel according to the value of the difference bit number field and the public network label carried in the data message from the MPLS-TP primary tunnel; and
determining the value of the corresponding difference bit in the public network label of a MPLS-TP protection tunnel according to the value of the difference bit number field and the public network label carried in the data message from the MPLS-TP protection tunnel.

6. The method according to claim 5, wherein, setting of the difference bit number field in the private network label table is:
comparing the public network label of the MPLS-TP primary tunnel with the public network label of the MPLS-TP protection tunnel from low bit to high bit in turn; and
setting the bit number where the difference appears in the value of the public network label for the first time as the value of the difference bit number field.

7. The method according to claim 5, wherein, setting of the decision field in the private network label table is:
when no protection switching occurs between the MPLS-TP primary tunnel and the MPLS-TP protection tunnel, the value of the decision field being an XOR result of the value of the corresponding difference bit in the public network label of the MPLS-TP primary tunnel with 0; and
when protection switching occurs between the MPLS-TP primary tunnel and the MPLS-TP protection tunnel, the value of the decision field being an XOR result of the value of the corresponding difference bit in the public network label of the MPLS-TP primary tunnel with 1; and
correspondingly, the carrying out the corresponding processing on the data message is: when the value of the difference bit is equal to the value of the decision field, forwarding the data message from the corresponding MPLS-TP tunnel; otherwise, discarding the data message.

8. The method according to claim 5, wherein, setting of the decision field in the private network label table is:
when no protection switching occurs between the MPLS-TP primary tunnel and the MPLS-TP protection tunnel, the value of the decision field being an XOR result of the value of the corresponding difference bit in the public network label of the MPLS-TP primary tunnel with 1; and
when protection switching occurs between the MPLS-TP primary tunnel and the MPLS-TP protection tunnel, the value of the decision field is an XOR result of the value of the corresponding difference bit in the public network label of the MPLS-TP primary tunnel with 0; and
correspondingly, the carrying out the corresponding processing on the data message is: when the value of the difference bit is unequal to the value of the decision field, forwarding the data message from the corresponding MPLS-TP tunnel; otherwise, discarding the data message.

9. A system for processing an MPLS-TP tunnel protection, comprising: a data receiving module, a data query module, a judgment module and a data processing module, wherein,
the data receiving module is configured to receive a data message from a multiprotocol label switching transport profile (MPLS-TP) tunnel;
the data query module is configured to query a private network label table according to a private network label carried in the data message, and acquiring a value of a protection flag field; further configured to acquire a value of a difference bit number field from the private network label table when the judgment module judges that a protection type of the MPLS-TP tunnel is 1+1, and determine a value of a corresponding difference bit in a public network label of the MPLS-TP tunnel; and further configured to acquire a value of a decision field from the private network label table;
the judgment module is configured to judge that the protection type of the MPLS-TP tunnel is 1+1 according to the value of the protection flag field; and further configured to compare the value of the difference bit and the value of the decision field, and provide a comparison result to the data processing module; and
the data processing module is configured to carry out corresponding processing on the data message according to the comparison result.

10. The system according to claim 9, wherein, the operation of the data processing module carrying out the corresponding processing on the data message comprises: forwarding the data message from the MPLS-TP tunnel or discarding the data message.

11. The system according to claim 9, further comprising: a data storage module, configured to store the private network label table; wherein,
the judgment module is further configured to judge that the data message reaches the tail node of the MPLS-TP tunnel according to a static label field in the public network label carried in the received data message; and further configured to judge whether a corresponding private network label table is able to be found in the data storage module according to the private network label before acquiring the value of the protection flag field; and
correspondingly, according to a query result, when the corresponding private network label table is not found, the data processing module is further configured to discard the data message; and when the corresponding private network label table is found, the query module acquiring the value of the protection flag field.

12. The system according to claim 9, wherein, the system further comprises a setting module, configured to set the protection flag field, the difference bit number field and the decision field in the private network label table.

* * * * *